(12) United States Patent
Deachin et al.

(10) Patent No.: US 8,918,983 B2
(45) Date of Patent: Dec. 30, 2014

(54) INTEGRATED FASTENING SYSTEM

(75) Inventors: Todd R. Deachin, Goodrich, MI (US); Gary Vanlerberghe, Melvin, MI (US); Jeffery C. Viaene, Almont, MI (US)

(73) Assignee: Zephyros, Inc., Romeo, MI (US)

( * ) Notice: Subject to any disclaimer, the term of this patent is extended or adjusted under 35 U.S.C. 154(b) by 132 days.

(21) Appl. No.: 13/529,238

(22) Filed: Jun. 21, 2012

(65) Prior Publication Data

US 2012/0324699 A1  Dec. 27, 2012

Related U.S. Application Data

(60) Provisional application No. 61/499,570, filed on Jun. 21, 2011.

(51) Int. Cl.
| | | |
|---|---|---|
| *B23P 11/00* | (2006.01) | |
| *B29C 44/12* | (2006.01) | |
| *B62D 29/00* | (2006.01) | |
| *B29C 44/18* | (2006.01) | |
| *B60R 13/08* | (2006.01) | |
| *B29C 65/60* | (2006.01) | |
| *B29C 65/00* | (2006.01) | |
| *B29C 65/58* | (2006.01) | |
| *B29L 31/00* | (2006.01) | |
| *B29L 31/30* | (2006.01) | |
| *B29C 65/78* | (2006.01) | |

(52) U.S. Cl.
CPC .......... *B62D 29/002* (2013.01); *B29C 44/1214* (2013.01); *B60R 13/0892* (2013.01); *B29C 65/606* (2013.01); *B29C 66/41* (2013.01); *B29C 65/58* (2013.01); *B29L 2031/737* (2013.01); *B29L 2031/30* (2013.01); *B29C 65/7814* (2013.01); *B29C 44/188* (2013.01)
USPC ............................. 29/525.01; 29/428; 29/446

(58) Field of Classification Search
CPC  B62D 29/002; B29C 44/1214; B29C 44/188; B29C 65/606; B29C 65/58; B29C 66/41; B29C 65/7814; B29L 2031/30; B29L 2031/29; B29L 2031/737; B60R 13/0892
USPC .............................................. 29/525.01, 428
See application file for complete search history.

(56) References Cited

U.S. PATENT DOCUMENTS

| | | |
|---|---|---|
| 5,575,526 A | 11/1996 | Wycech |
| 5,755,486 A | 5/1998 | Wycech |
| 5,766,719 A | 6/1998 | Rimkus |

(Continued)

FOREIGN PATENT DOCUMENTS

| | | |
|---|---|---|
| DE | 19835704 | 2/2000 |
| EP | 0453777 B1 | 5/1994 |

(Continued)

OTHER PUBLICATIONS

PCT International Search Report and Written Opinion dated Dec. 21, 2012; (PCT/US2012/043473).

(Continued)

*Primary Examiner* — Sarang Afzali
*Assistant Examiner* — Ruth G Hidalgo-Hernanderuth
(74) *Attorney, Agent, or Firm* — The Dobrusin Law Firm, PC

(57) ABSTRACT

A method for reinforcing, baffling or sealing a vehicle structure by providing a sealing body with an integrated fastening tab.

16 Claims, 4 Drawing Sheets

(56) References Cited

U.S. PATENT DOCUMENTS

| | | |
|---|---|---|
| 5,829,482 A | 11/1998 | Takabatake |
| 5,932,680 A | 8/1999 | Heider |
| 5,937,486 A * | 8/1999 | Bockenheimer ............... 24/297 |
| 7,125,461 B2 | 10/2006 | Czaplicki et al. |
| 7,199,165 B2 | 4/2007 | Kassa et al. |
| 7,313,865 B2 | 1/2008 | Czaplicki et al. |
| 7,802,955 B2 * | 9/2010 | Jatzke ........................ 411/508 |
| 8,028,799 B2 | 10/2011 | Hasler et al. |
| 8,079,442 B2 | 12/2011 | Wojtowicki |
| 8,087,916 B2 | 1/2012 | Kanie et al. |
| 8,293,360 B2 | 10/2012 | Cousin |
| 8,388,037 B2 | 3/2013 | Lanore et al. |
| 8,444,214 B2 | 5/2013 | Helferty et al. |
| 8,469,143 B2 | 6/2013 | Prunarety et al. |
| 2004/0011282 A1 | 1/2004 | Myers et al. |
| 2004/0076831 A1 | 4/2004 | Hable et al. |
| 2005/0260399 A1 | 11/2005 | Finerman |
| 2006/0073266 A1 | 4/2006 | Myers et al. |
| 2008/0110694 A1 | 5/2008 | Niezur |
| 2009/0001758 A1 | 1/2009 | Hanley, IV et al. |
| 2009/0111371 A1 | 4/2009 | Niezur et al. |
| 2010/0253004 A1 | 10/2010 | Lehmann |
| 2010/0320028 A1 | 12/2010 | Wojtowicki |
| 2011/0057392 A1 | 3/2011 | Monnet et al. |
| 2011/0109003 A1 | 5/2011 | LaNore et al. |
| 2011/0189428 A1 | 8/2011 | Belpaire et al. |
| 2011/0192675 A1 | 8/2011 | Lecroart et al. |
| 2012/0207986 A1 | 8/2012 | Belpaire et al. |
| 2012/0295093 A1 | 11/2012 | Belpaire et al. |
| 2013/0087406 A1 | 4/2013 | Franey et al. |
| 2013/0140731 A1 | 6/2013 | Belpaire |
| 2013/0181470 A1 | 7/2013 | Lanore et al. |

FOREIGN PATENT DOCUMENTS

| | | |
|---|---|---|
| EP | 2097308 B1 | 9/2009 |
| EP | 2134799 A1 | 12/2009 |
| EP | 2236358 B1 | 6/2010 |
| EP | 2242634 A1 | 10/2010 |
| EP | 2176113 B1 | 4/2011 |
| EP | 2330019 A1 | 8/2011 |
| EP | 2360002 A1 | 8/2011 |
| EP | 2390077 A1 | 11/2011 |
| EP | 2507116 A1 | 10/2012 |
| EP | 2533961 A1 | 12/2012 |
| EP | 2576176 A1 | 4/2013 |
| EP | 1534561 B1 | 8/2013 |
| EP | 2262633 B1 | 9/2013 |
| JP | 11165598 | 6/1999 |
| JP | 2002347058 | 2/2002 |
| JP | 2004230834 | 8/2004 |
| JP | 2006123710 | 5/2006 |
| JP | 2007084015 | 4/2007 |
| WO | 0043253 | 7/2000 |
| WO | 2008065049 | 6/2008 |
| WO | 2009117376 | 9/2009 |
| WO | 2011/134943 A1 | 11/2011 |
| WO | 2011146793 | 11/2011 |
| WO | 2011/147872 A1 | 12/2011 |

OTHER PUBLICATIONS

PCT International Search Report and Written Opinion dated May 6, 2009 (PCT/US2009/037337).

International Preliminary Report on Patentability dated Feb. 6, 2010 (PCT/US2009/037337).

Chinese Office Action dated Sep. 26, 2011; Appln. No. 200980109337.3.

PCT International Preliminary Report on Patentability dated Oct. 11, 2013 (Appln. No. PCT/US2012/043473).

* cited by examiner

INTEGRATED FASTENING SYSTEM

CLAIM OF PRIORITY

The present application claims the benefit of the priority of U.S. Provisional Application Ser. No. 61/499,570, filed Jun. 21, 2011, the contents of which are incorporated by reference herein.

TECHNICAL FIELD

The present invention relates generally to a baffling, sealing, or reinforcement member that includes an integrated fastening tab.

BACKGROUND

Various fastening devices are utilized in the transportation industry to attach baffling, reinforcement and sealing devices to a location within a transportation vehicle. While necessary for effective attachment, such fastening devices require additional manufacturing steps for forming and installing the fastening device, resulting in an increase in manufacturing time and cost, and often an increase in the overall weight of a part to which the fastening device is attached. There is thus a need in the art for a fastener capable of attaching a part to a desired location without adding substantial weight or manufacturing time. The teachings herein provide for a sealing body having an integrally formed fastening tab so that no additional fastening means may be required.

SUMMARY OF THE INVENTION

In a first aspect the present invention contemplates a method for locating a sealing device comprising providing a sealing body having a first surface and an opposing second surface, the sealing body comprising an expandable material and forming one or more recess portions on the first surface of the sealing body. The method may further include forming one or more integrated fastening tabs within the one or more recess portion, the one or more integrated fastening tabs integrally formed with the expandable material of the sealing body and forming a button on the second surface of the sealing body that opposes each of the one or more integrated fastening tabs. One or more fastening tabs may be located into an opening in a part or cavity wall for receiving the one or more fastening tabs by depressing the button. The method may also include expanding the expandable material so that the sealing expands along one surface of the opening and the integrated fastening tab expands along an opposing surface of the opening. The location of the sealing body and integrated fastening tab may thus be maintained by virtue of the expansion of the expandable material.

The invention herein contemplates a device and method for the sealing of cavities with an expandable sealing body including one or more integrated fastening tabs. The expandable sealing body and integrated fastening tab disclosed herein may allow for effective baffling and/or sealing of a cavity with a lightweight structure with no need for additional fastening means.

DETAILED DESCRIPTION

The present invention allows for improved baffling, reinforcement, and/or sealing of a cavity with a lightweight sealing body and integrated fastening tab. The sealing body and integrated fastening tab disclosed herein may be integrally formed from the same material, which may be an expandable material. The sealing body may include one or more recess portions within which integrated fastening tabs may be formed. These recess portions may also include an opening within the recess, and a fastening tab may be located adjacent the opening within the recess. The integrated fastening tab may be formed in varying shapes, including the shape of a partial arrowhead fastener or in a shape that includes a bottom edge.

Each of the one or more fastening tabs may be located adjacent an opening in the recess portion. Each of the one or more fastening tabs is formed in the shape of a partial arrowhead fastener. An additional fastener is located onto a terminal end of the fastening tab so that the additional fastener is located in contact with the opening and assists in maintaining the fastening tab within the opening.

The methods described herein may include locating the fastening tab into an opening in a cavity wall or on a part by depressing the button. The fastening tab may include a bottom edge that is located above an opening into which the fastening tab is located. The fastening tab may be flexible to allow for entry into an opening that is smaller than the largest diameter of the fastening tab. The fastening tab may be located into an opening in a cavity wall or on a part wherein the largest diameter of the opening has a smaller diameter than the largest diameter of the fastening tab. The fastening tab may be located into an opening for receiving the fastening tab and expanding the expandable material that forms the sealing body and fastening tab so that the sealing body expands along one surface of the opening and the fastening tab expands along an opposing surface of the opening. The fastening tab may be located into an opening for receiving the fastening tab and expanding the expandable material that forms the sealing body and fastening tab so that the fastening tab is held in place within the opening by virtue of the expansion of the sealing body and fastening tab.

The integrated fastening tabs may be formed as a cut-out from the material that comprises the recess portion which results in formation of the opening located adjacent each of the one or more fastening tabs. The sealing body may be located onto a part and may have openings formed therein that correspond with openings along the part. The sealing body may be located onto a part and may adhere to the part upon expansion of the expandable material.

Figure 1:
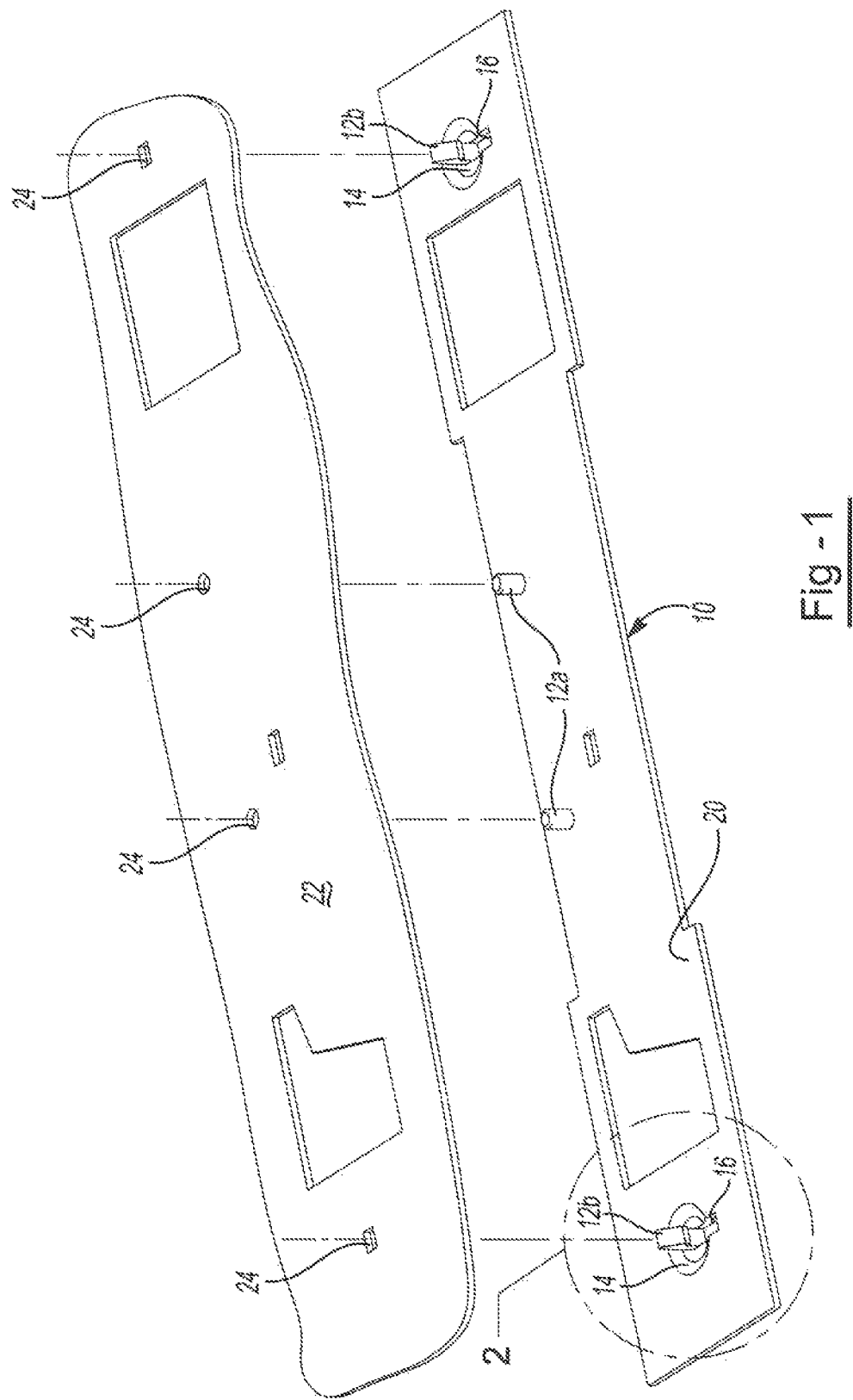
FIG. 1 shows a full sealing body with multiple integrated fastening tabs prior to attachment to a desired attachment location.

FIG. 1 shows an illustrative example of the sealing body 10 and integrated fastening tabs 12a and 12b prior to attachment to the desired attachment location 22. This attachment location may be part or may be a wall of a cavity. The sealing body 10 and integrated fastening tabs 12a and 12b are integrally formed of the same material, which may be an expandable material 20 (shown prior to expansion). For attachment of the sealing body 10, the integrated fastening tabs 12a and 12b may enter the openings 24 of the desired attachment location 22. This illustrative example shows possible locations and shapes for the integrated fastening tabs. In this illustrative example, the integrated fastening tab 12a is integrated with a substantially planar portion of the sealing body 10 and is formed in a cylindrical shape. Another integrated fastening tab 12b is located within a recess portion 14 of the sealing body 10 and is formed in a partial arrowhead shape. The integrated fastening tabs may be flexible and/or shaped to fit into or through the openings 24. The integrated fastening tab 12b is also located adjacent an opening 16 in the recessed portion 14.

Figure 2:
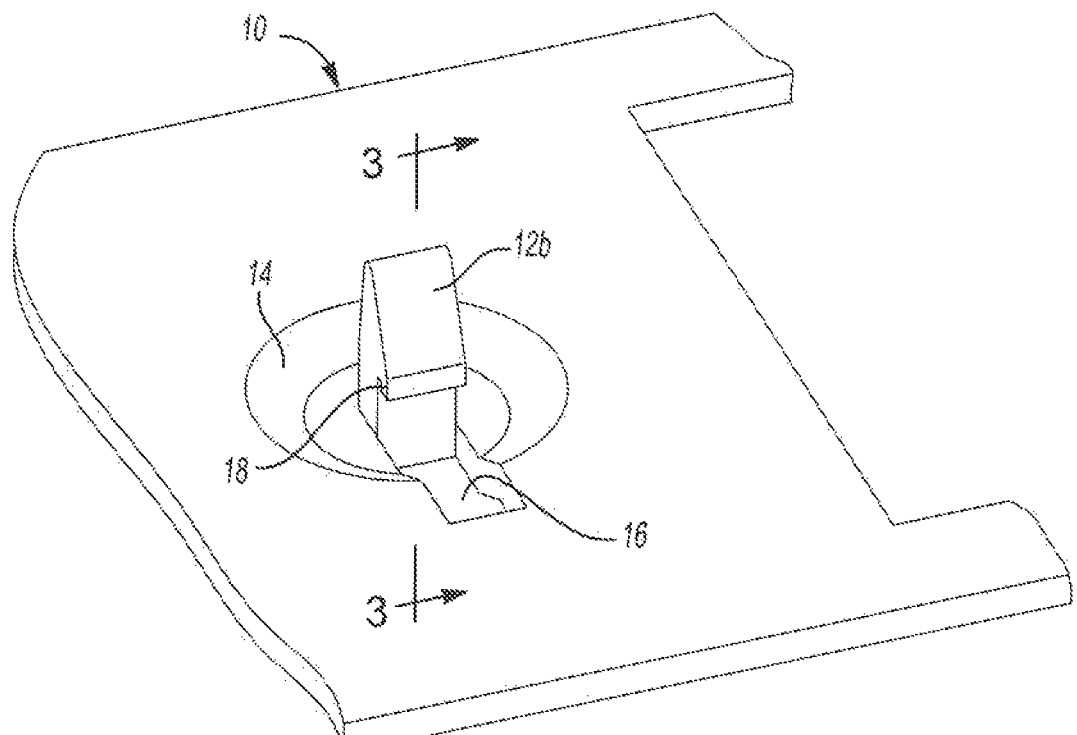
FIG. 2 shows a close up view of a fastening tab of FIG. 1.

FIG. 2 shows a perspective view of the area 2 circled in FIG. 1, which includes the sealing body 10 and integrated fastening tab 12b. The integrated fastening tab 12b is located adjacent an opening 16 within the recess portion 14 of the sealing body 10. In this illustrative example, the integrated fastening tab 12b has a bottom edge 18 and is formed in the shape of a partial arrowhead fastener.

Figure 3:
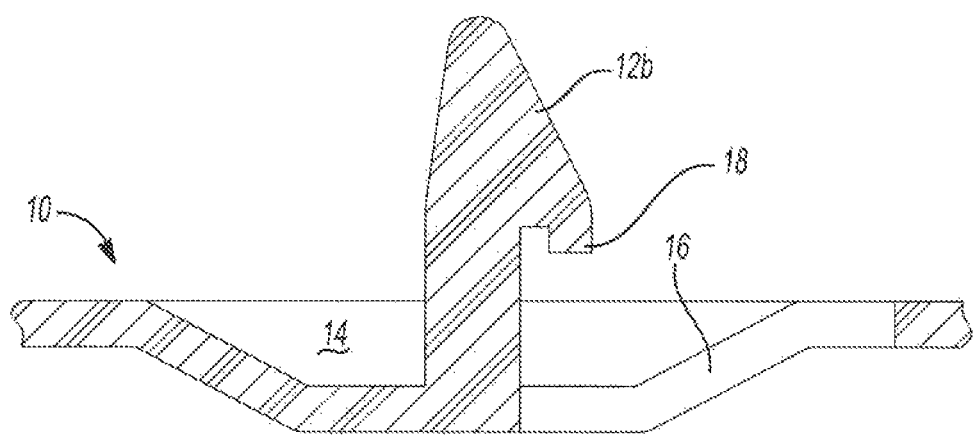
FIG. 3 shows a cross-sectional profile view of the integrated fastening tab of FIG. 2.

FIG. 3 shows a side view of FIG. 2 cut at line 3 to show the partial arrowhead shape of the integrated fastening tab 12b and an example of the opening 16 within the recess portion 14. This figure also provides an example of the recess portion 14 and shows the bottom edge of the fastening tab 18.

Figure 4:
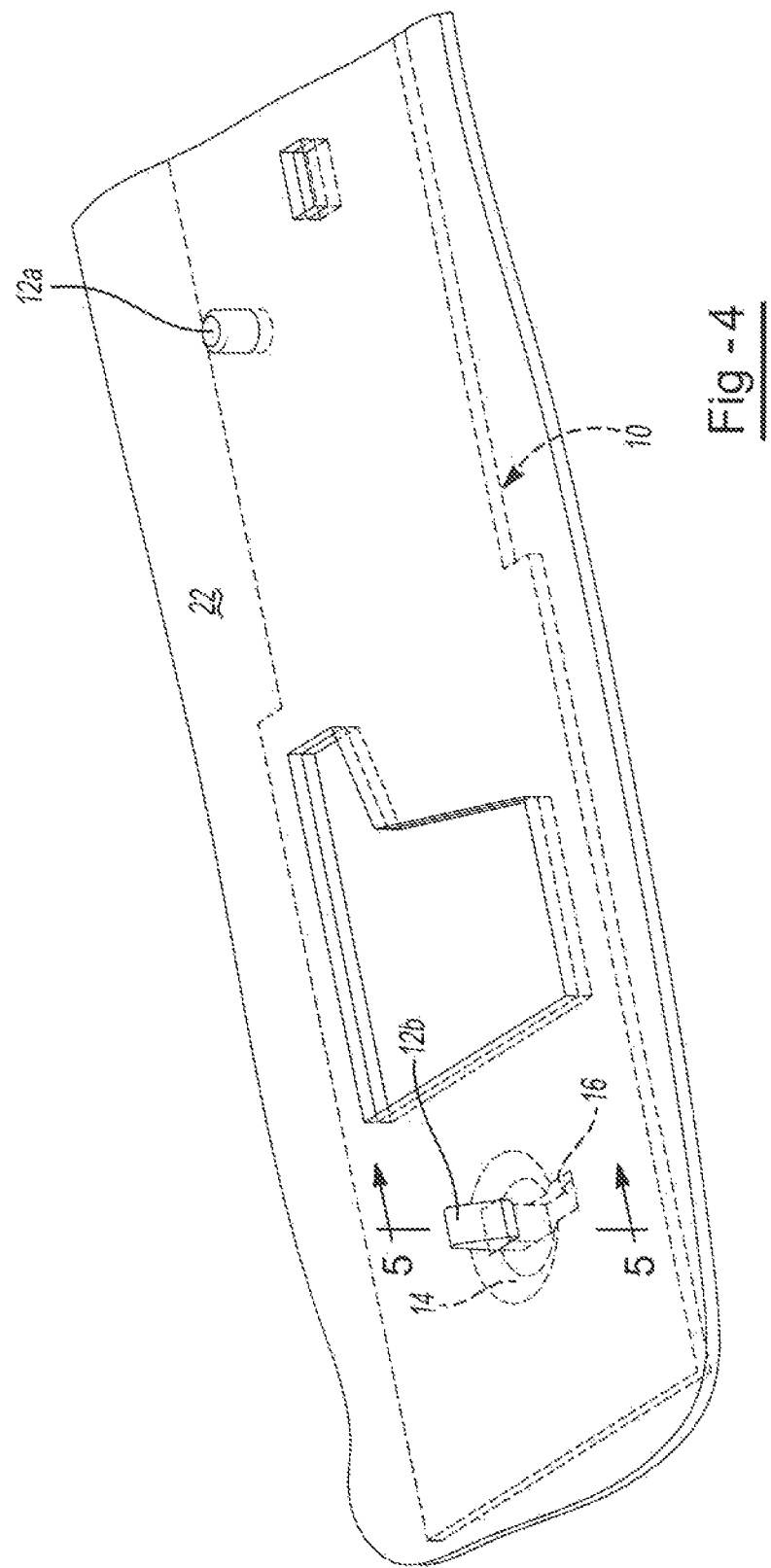
FIG. 4 shows a perspective view of the sealing body and integrated fastening tab of FIG. 1 attached to a desired attachment location.
Figure 5:
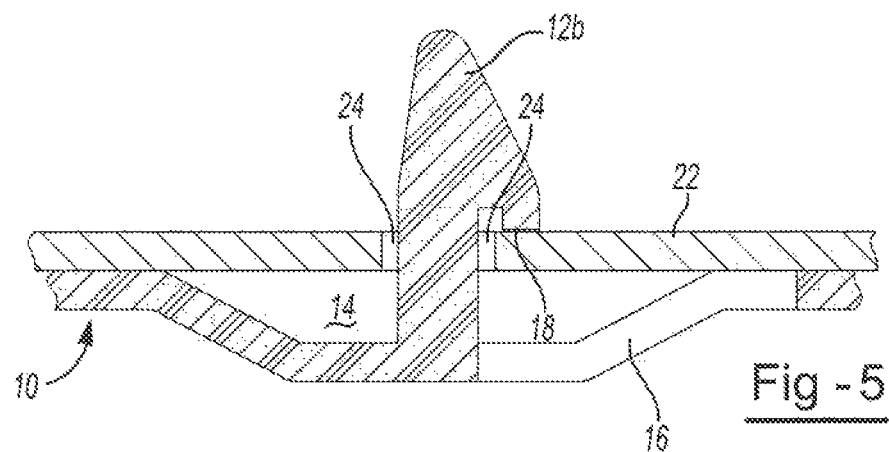
FIG. 5 shows a cross-sectional profile view of the sealing body and integrated fastening tab attached to a desired attachment location of FIG. 4.
Figure 6:
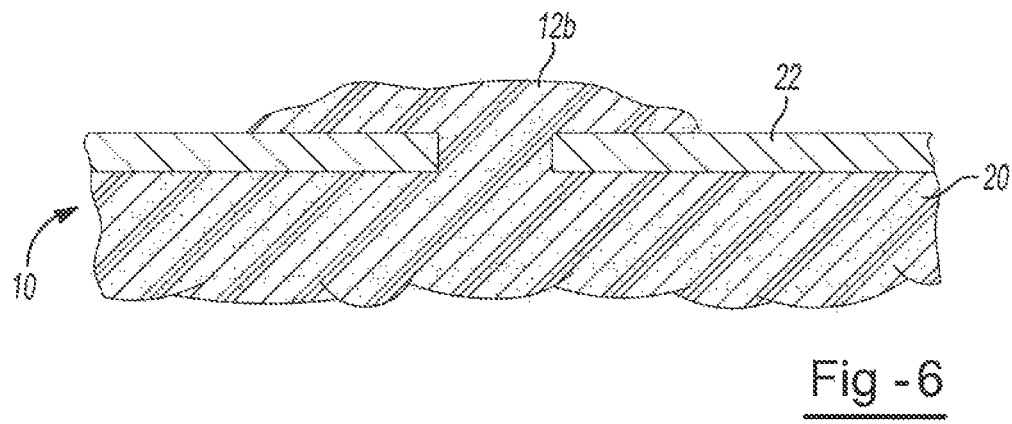
FIG. 6 shows a cross-sectional profile view of the sealing body and integrated fastening tab of FIG. 5 in its expanded state.
Figure 7:
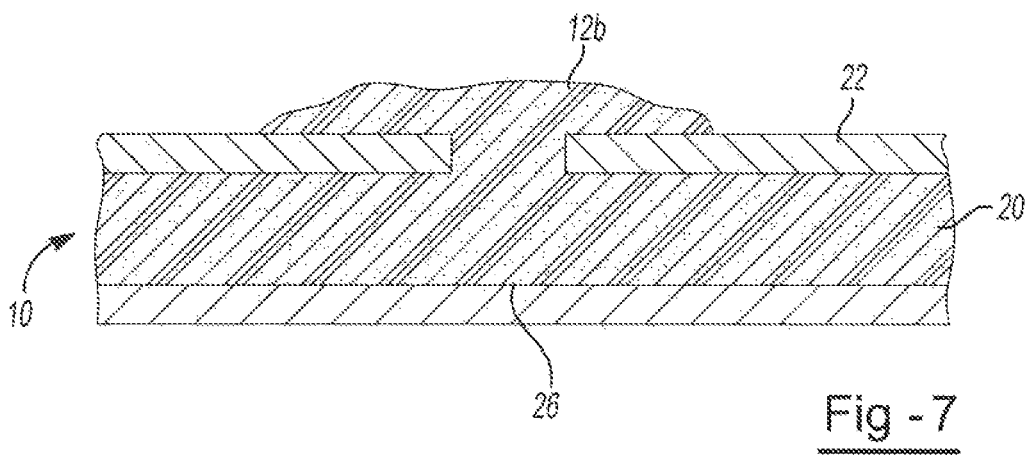
FIG. 7 shows a cross-sectional profile view of the sealing body and integrated fastening tab of FIG. 5 in its expanded state and filling a cavity.

FIG. 4 is an assembled view of FIG. 1. The integrated fastening tabs 12a and 12b of the sealing body 10 are inserted into the openings in the desired attachment location 22. FIG. 5 is a side view of FIG. 4 cut at line 5. The integrated fastening tab 12b is inserted through the opening 24 in the attachment location 22. In this illustrative example, the integrated fastening tab 12b includes a bottom edge 18 that is located above the opening 24 into which the fastening tab 12b is located. It is contemplated that this fastening tab 12b can be flexible to allow for entry into the opening 24 if it is smaller than the largest diameter of the integrated fastening tab 12b. FIGS. 6 and 7 show a side view of the sealing body 10 and integrated fastening tab 12b formed of expandable material 20 in its expanded state. FIG. 7 shows the expandable material 20 in its expanded state, expanding to an inner wall of a cavity 26 to seal off the cavity.

The integrally formed fastener can have any shape and function that can be formed by an expandable material. As an example, the fastener may be a tree-fastener or a threaded screw fastener. The fastener may also be provided in a variety of shapes and in a variety of configurations so long as it can secure the sealing body to a desired location. The fastener may be capable of securing multiple layers or types of materials to a structure. Examples of suitable forms for the fasteners include clips, tabs, press-fits, snap-fits, screws, hooks, combinations thereof or the like. The fastener may be cut to form a tab or may be cut to engage in a friction fit with and opening or even a corresponding receiving fastener. Upon formation of the cut-out fasteners, the fasteners may be bent, curved and/or otherwise deformed in a direction so that they contact a portion of a part or cavity and/or a portion of an additional fastening device for attachment to a part or cavity. The integrated fastener may be capable of receiving an additional fastening means located thereon after the fastener has been located into an opening. The integrated fastener may be shaped as a partial arrowhead fastener. The integrated fastener may have a flat bottom edge wherein its largest diameter is located along that edge. The integrated fastening tab may be flexible so that it can be located into an opening having a diameter (which may be its largest diameter) that is smaller than the largest diameter of the fastening tab.

The integrated fastening tab may be located within a recess located on the sealing body. The recess may form a button on the opposing side of the sealing body (e.g., the side that the fastening tab is not located on) so that a force may be exerted on the button to locate the fastening tab into an opening.

The fastener may be shaped so that prior to expansion of the expandable material a bottom edge of the fastener (e.g., the lowermost edge of the fastener) extends through and beyond an opening for receiving the fastener. Further, the fastener may be formed so that upon locating the fastener through an opening and expanding the expandable material, the entirety of the expandable material that forms the fastener is located on one side of the opening (the side of the opening opposite the remainder of the sealing body).

The fastener may be an integrally formed fastener whereby the fastener is cut from a portion of the sealing body material. An opening may be formed adjacent the fastener as a result of the material for forming the fastener being cut from the sealing body. By cutting the fasteners into integrally formed fasteners a cut-out fastener is formed so that at least a portion of the cut-out fastener is still attached to the sealing device. The sealing device may be installed so that the one or more fasteners contact a vehicle cavity wall. The fastening may occur so that the sealing device is rotated upon placement within a vehicle cavity. The fastening may also occur so that the one or more fasteners are pressed into an aperture for receiving the fastener within a part or cavity wall so that no additional step of movement or rotation is required for installation. Thus, a button may be formed on the surface of the sealing body that opposes the surface upon which a fastener is located. The button may be located opposite the fastener so that the button can be contacted and pressure applied to the button so that that the fastener enters securely into a desired opening.

The size of the expandable sealing body and integrated fastening tab may depend upon the size of the cavity or part to which the expandable sealing body and integrated fastening tab are attached to. The thickness of the expandable sealing body may be at least about 0.1 mm. The thickness of the expandable sealing body may be less than about 10 mm. The thickness of the expandable sealing body may be from about 0.5 mm to about 6 mm. The thickness of the expandable sealing body may be less than about 8 mm. The thickness of the expandable sealing body may be from about 0.2 mm to about 5 mm.

After placement of the expandable sealing body and integrated fastening tab into a cavity, the expandable material may expand according to a predetermined set of conditions. For example, exposure to certain levels of heat may cause the expandable material to expand. The volumetric expansion of the expandable material may vary depending upon the sealing and/or baffling needs of a particular cavity. The expandable sealing body and integrated fastening tab may expand at least about 100%. The expandable material may expand less than about 2000%. The expandable material may expand at least about 500%, at least about 1000%, or more. The expandable material may expand less than about 1000% or even less than about 500%.

The expandable sealing body and integrated fastening tab may be generally dry to the touch or tacky and may be shaped in any form of desired pattern, placement, or thickness, but is preferably of substantially uniform thickness. Though other heat-activated materials are possible for the expandable sealing body and integrated fastening tab, a preferred heat activated material is an expandable polymer or plastic, and preferably one that is foamable. The expandable sealing body and integrated fastening tab may be a relatively high expansion foam having a polymeric formulation that includes one or more of an epoxy resin, an acetate (e.g. ethylene vinyl acetate), a thermoplastic polyether, an acrylate and/or a methacrylate (e.g., a copolymer of butyl acrylate and methyl acrylate), an epoxy/elastomer adduct, and one or more fillers (e.g., a clay filler, and/or a nanoparticle-containing filler). Preferred thermally expandable materials are disclosed in U.S. Pat. Nos. 7,313,865; 7,125,461; and 7,199,165 incorporated by reference herein for all purposes. For example, and without limitation, the foam may also be an EVA/rubber based material, including an ethylene copolymer or terpolymer that may possess an alpha-olefin. As a copolymer or terpolymer, the polymer is composed of two or three different monomers, i.e., small molecules with high chemical reactivity that are capable of linking up with similar molecules. Suitable expandable materials include those available from L&L Products, Inc. under the designations L7220, L2821, L1066, L205, L2010, L2105, L2108A, L2806, L2811, L4200, L4141, L4161, L4315, L5510, L5520, L5540, L5600, L5601, L7102, and L7104. The expandable sealing body and integrated fastening tab may be die cut material.

A number of baffling or sealing foams may also be used for the expandable sealing body and integrated fastening tab. A typical foam includes a polymeric base material, such as one or more ethylene-based polymers which, when compounded with appropriate ingredients (typically a blowing and curing agent), will expand and cure in a reliable and predictable manner upon the application of heat or the occurrence of a particular condition. From a chemical standpoint for a thermally-activated material, the foam is usually initially processed as a flowable material before curing, and upon curing, the material will typically cross-link making the material incapable of further flow.

The expandable material can be formed of other materials provided that the material selected is heat-activated or otherwise activated by an ambient condition (e.g. moisture, pressure, time or the like) and cures under appropriate conditions for the selected application. One such material is the epoxy based resin disclosed in U.S. Pat. No. 6,131,897, the teachings of which are incorporated herein by reference. Some other possible materials include, but are not limited to, polyolefin materials, copolymers and terpolymers with at least one monomer type an alpha-olefin, phenol/formaldehyde materials, phenoxy materials, and polyurethane materials with high glass transition temperatures. Additional materials may also be used such as those disclosed in U.S. Pat. Nos. 5,766,719; 5,755,486; 5,575,526; and 5,932,680, incorporated by reference herein for all purposes.

In applications where the expandable material is a heat activated material, an important consideration involved with the selection and formulation of the material is the temperature at which a material cures and, if expandable, the temperature of expansion. Typically, the material becomes reactive (cures, expands or both) at higher processing temperatures, such as those encountered in an automobile assembly plant, when the material is processed along with the automobile structures at elevated temperatures or at higher applied energy levels, e.g., during coating (e.g., e-coat, paint or clearcoat) curing steps. While temperatures encountered in an automobile assembly operation may be in the range of about 148.89° C. to 204.44° C. (about 300° F. to 400° F.) for body shop applications (e.g., e-coat) and, for paint shop applications, are commonly about 93.33° C. (about 200° F.) or slightly higher (e.g., 120° C.-150° C.).

The expandable sealing body and integrated fastening tab of the present invention may be installed into an automotive vehicle although it may be employed for other articles of manufacture such as boats, buildings, furniture, storage containers or the like. The expandable sealing body and integrated fastening tab may be used to seal and/or baffle a variety of components of an automotive vehicle including, without limitation, body components (e.g., panels), frame components (e.g., hydroformed tubes), pillar structures (e.g., A, B, C or D-pillars), bumpers, roofs, bulkheads, instrument panels, wheel wells, floor pans, door beams, hem flanges, vehicle beltline applications, doors, door sills, rockers, decklids, hoods or the like of the automotive vehicle.

The expandable sealing body and integrated fastening tab may also include an adhesive layer that comprises an outer surface of the expandable sealing body and integrated fastening tab. The expandable sealing body and integrated fastening tab may include a plurality of sides with varying lengths, the lengths of some sides being substantially longer than the lengths of other sides. The sealing body and integrated fastening tab, the cut-outs, or both may be substantially rectangular in shape.

The materials may also include a film layer, such as that disclosed in U.S. Patent Publication Nos. 2004/0076831 and 2005/0260399, incorporated by reference herein for all purposes. The film layer may be used to cover a material that is tacky to the touch. The film layer may be removed from the material prior to application of the material to a vehicle structure, such that the film will reveal a tacky surface of the material that will adhere to the structure.

The materials and formation process of the present invention create a simplified lightweight sealing, reinforcement, and baffling device that can be easily customized to fit any cavity. The integrated fastening tab may be molded onto the sealing body.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the Invention of a range in terms of at "x parts by weight of the resulting polymeric blend composition" also contemplates a teaching of ranges of same recited amount of "x" in percent by weight of the resulting polymeric blend composition.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

The invention claimed is:

1. A method for locating a sealing device comprising:
   a. providing a sealing body having a first surface and an opposing second surface;
   forming one or more recess portions on the first surface of the sealing body;
   c. forming one or more integrated fastening tabs within the one or more recess portions adjacent an opening, in the one or more recess portions;
   d. forming a button on the second surface of the sealing body that opposes each of the one or more integrated fastening tabs;
      wherein the one or more integrated fastening tabs are formed as a cut-out from material that comprises the one or more recess portions which results in formation of the opening located adjacent each of the one or more integrated fastening tabs; and
      wherein the sealing body and the one or more integrated fastening tabs are integrally formed from an expandable material.

2. The method of claim 1, wherein each of the one or more integrated fastening tabs is located adjacent an opening in the recess portion.

3. The method of claim 1, wherein each of the one or more integrated fastening tabs is formed in the shape of a partial arrowhead fastener.

4. The method of claim 1, including locating the one or more integrated fastening tabs into an opening in a cavity wall or on a part by depressing the button.

5. The method of claim 1: wherein the one or more integrated fastening tabs includes a bottom edge that is located above the opening located adjacent each of the one or more integrated fastening tabs.

6. The method of claim 1, wherein the one or more integrated fastening tabs are flexible to allow for entry into an opening in a cavity wall or on a part that is smaller than a largest diameter of the one or more integrated fastening tabs.

7. The method of claim 1, including locating the one or more integrated fastening tabs into an opening in a cavity wall or on a part wherein the largest diameter of the opening in the cavity wall or on the part has a smaller diameter than a largest diameter of the one or more integrated fastening tabs.

8. The method of claim 1, including locating the one or more integrated fastening tabs into an opening in a cavity wall or on a part for receiving the one or more integrated fastening tabs and expanding the expandable material that forms the sealing body and the one or more integrated fastening tabs so that the sealing body expands along one surface of the opening in the cavity wall or on the part and the one or more integrated fastening tab expands along an opposing surface of the opening in the cavity wall or on the part.

9. The method of claim 1, including locating the one or more integrated fastening tabs into an opening in a cavity wall or on a part for receiving the one or more integrated fastening tab and expanding the expandable material that forms the sealing body and the one or more integrated fastening tab so that the one or more integrated fastening tab is held in place within the opening in the cavity wall or on the part by virtue of the expansion of the sealing body and the one or more integrated fastening tab.

10. A method for locating a sealing device comprising:
   a. providing a sealing body having a first surface and an opposing second surface, the sealing body comprising an expandable material;
   b. forming one or more recess portions on the first surface of the sealing body;
   c. forming one or more integrated fastening tabs within the one or more recess portions, the one or more integrated fastening tabs integrally formed with the expandable material of the sealing body and located adjacent an opening in the one or more recess portions;
   d. forming a button on the second surface of the sealing body that opposes each of the one or more integrated fastening tabs;
   e. locating the one or more fastening tabs into an opening in a part or cavity wall for receiving the one or more fastening tabs by depressing the button;
   f. expanding the expandable material so that the sealing expands along one surface of the opening in the part or cavity wall and the one or more integrated fastening tabs expands along an opposing surface of the opening in the part or cavity wall;
   wherein the one or more integrated fastening tabs are formed as a cut-out from material that comprises the one or more recess portions which results in formation of the opening located adjacent each of the one or more fastening tabs; and
   wherein the location of the sealing body and the one or more integrated fastening tabs is maintained by virtue of the expansion of the expandable material.

11. The method of claim 10, wherein each of the one or more integrated fastening tabs is formed in the shape of a partial arrowhead fastener.

12. The method of claim 10, wherein the one or more integrated fastening tabs include a bottom edge that is located above the opening located adjacent each of the one or more integrated fastening tabs.

13. The method of claim 10, wherein the one or more integrated fastening tabs is flexible to allow for entry into an opening that is smaller than a largest diameter of the one or more integrated fastening tabs.

14. The method of claim 10, including locating the one or more integrated fastening tabs into the opening in the cavity wall or on the part wherein the largest diameter of the opening in the cavity wall or on the part has a smaller diameter than a largest diameter of the one or more integrated fastening tabs.

15. Tile method of claim 10, wherein the sealing body is located onto the part and the opening formed in the one or more recess portions correspond with the opening along the part.

16. The method of claim 10, wherein the sealing body is located onto the part and adheres to the part upon expansion of the expandable material.

* * * * *